Jan. 5, 1965   M. K. RICHMOND   3,164,761
LOAD-RESPONSIVE, AUTOMATIC-STOP DRIVE MECHANISM
Filed Oct. 20, 1959   3 Sheets-Sheet 1
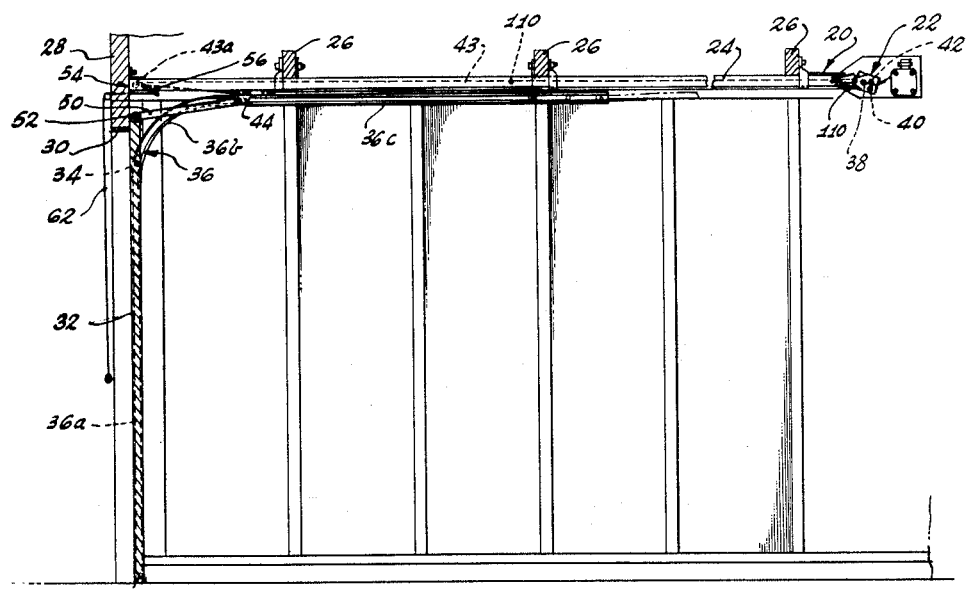
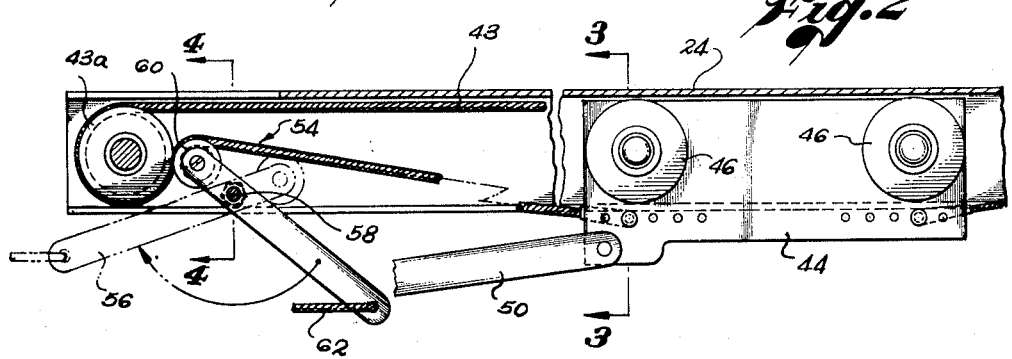
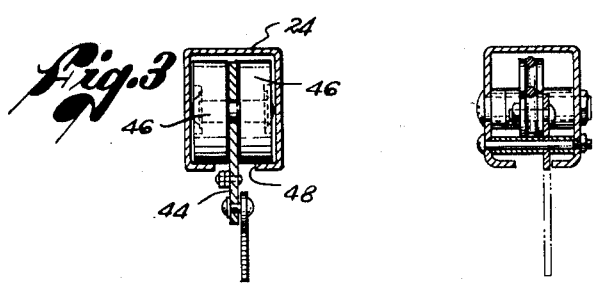
INVENTOR.
MOSCOW K. RICHMOND
BY Lilly & Nyhagen
ATTORNEYS Jan. 5, 1965 M. K. RICHMOND 3,164,761
LOAD-RESPONSIVE, AUTOMATIC-STOP DRIVE MECHANISM
Filed Oct. 20, 1959 3 Sheets-Sheet 2
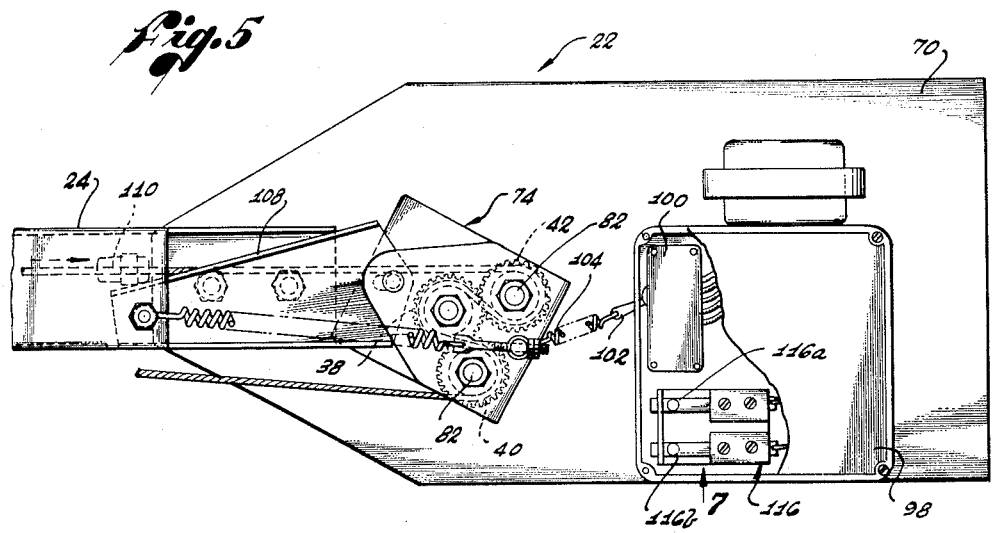
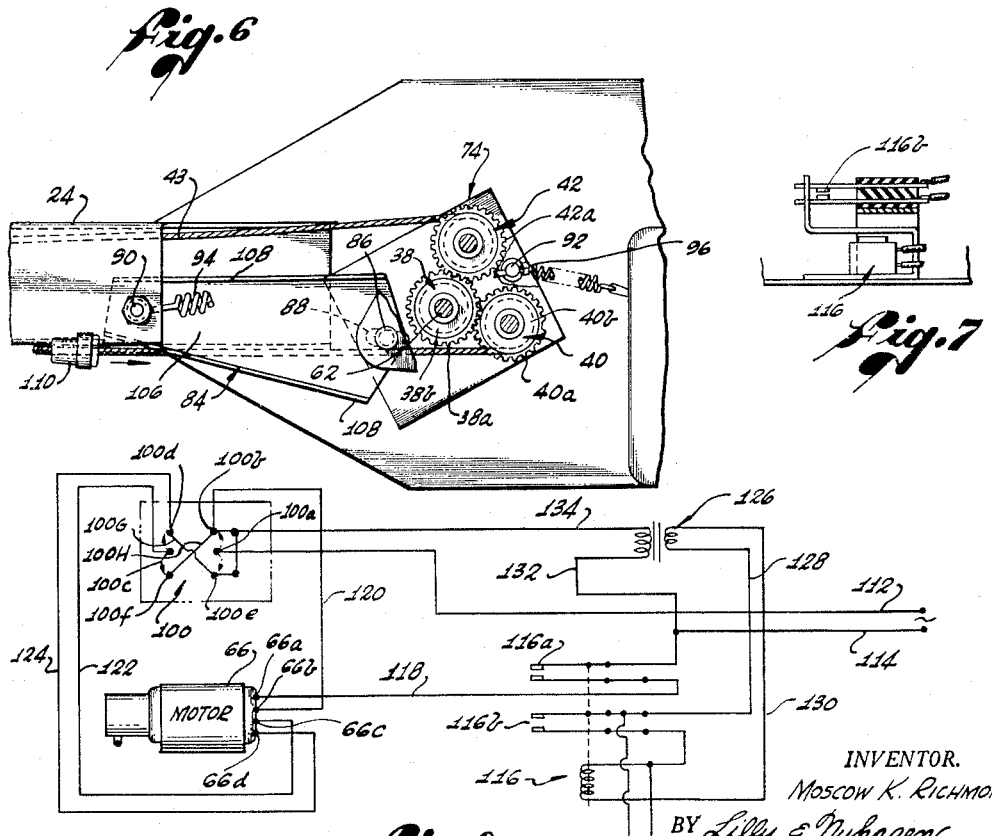
INVENTOR.
Moscow K. Richmond
BY Lilly & Nyhagen
ATTORNEYS Jan. 5, 1965        M. K. RICHMOND        3,164,761
LOAD-RESPONSIVE, AUTOMATIC-STOP DRIVE MECHANISM
Filed Oct. 20, 1959        3 Sheets-Sheet 3
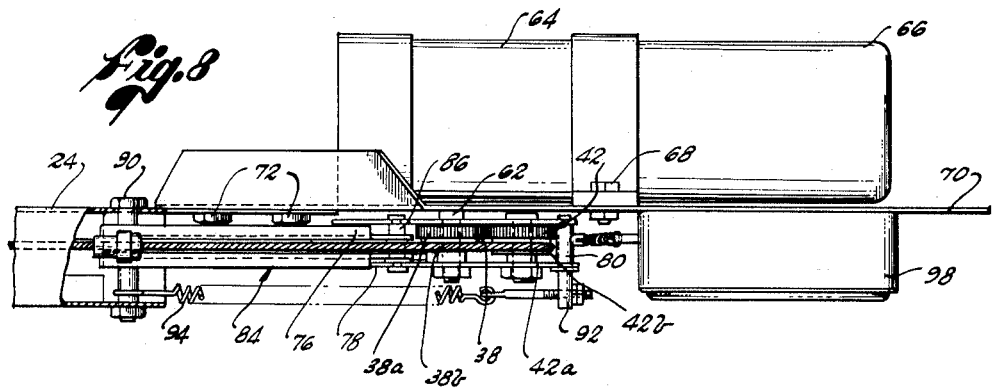
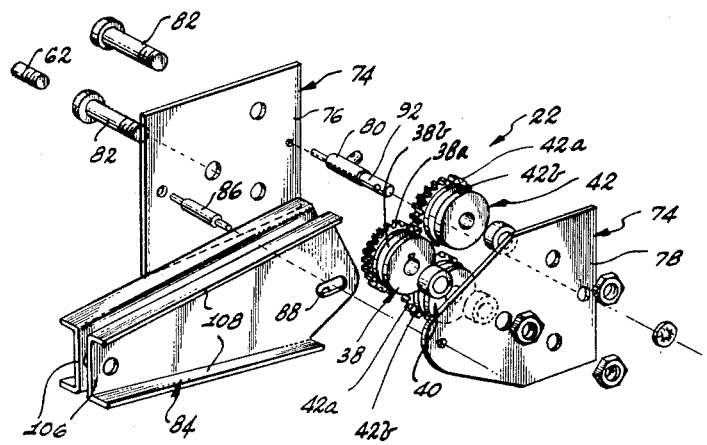
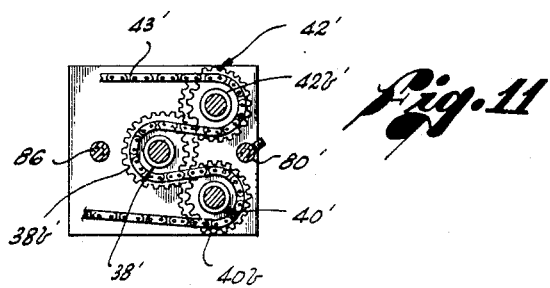
INVENTOR.
MOSCOW K. RICHMOND
BY Lilly & Nyhagen
ATTORNEYS

United States Patent Office 3,164,761
Patented Jan. 5, 1965

3,164,761
LOAD-RESPONSIVE, AUTOMATIC-STOP
DRIVE MECHANISM
Moscow K. Richmond, 2819 Butler Ave.,
Los Angeles, Calif.
Filed Oct. 20, 1959, Ser. No. 847,497
12 Claims. (Cl. 318—266)

This invention deals generally with mechanical drive mechanisms and, more particularly, with a drive mechanism embodying a unique combined safety and limit means for deactivating the drive mechanism in response to a predetermined load on as well as predetermined travel of the driven member of the mechanism.

The invention is intended primarily as a means for mechanically opening and closing garage doors, and the like. For this reason, the invention will be described in connection with its use in a garage door operator. It will become readily apparent as the description proceeds, however, that the invention is capable of a wide variety of other uses and applications so that the illustrative embodiment of the invention in a garage door operator should not be regarded as limiting in nature.

A general object of the invention is to provide a new and improved mechanical drive mechanism of the character described.

A more specific object of the invention is to provide a mechanical drive mechanism embodying a unique combined safety and limit means for deactivating the mechanism in response to a predetermined load on, as well as predetermined travel of the driven member of the mechanism.

Another object of the invention is to provide a mechanical drive mechanism of the character described in which the driven element may comprise a frictionally driven, flexible power transmission element, such as a cable, and wherein a unique friction drive arrangement is employed for moving the driven element.

A further object of the invention is to provide a mechanical drive mechanism of the character described which is especially suited for use as a garage door operator in which simplified means are provided for releasing the garage door for manual operation, from the outside of the garage, in the event of malfunctioning of the drive mechanism.

Yet a further object of the invention is to provide a mechanical drive mechanism of the character described which is relatively simple in construction, inexpensive to manufacture and otherwise ideally suited to its intended purposes.

Other objects, advantages and features of the invention will become readily apparent as the description proceeds.

Briefly stated, the objects of the invention are attained by providing a drive mechanism equipped with a rotary driver that engages the driven element of the mechanism so as to move the latter in one direction or the other upon rotation of the driver. During this driving of the element, a reaction force is exerted on the driver. The mechanism embodies means for continuously sensing this reaction force and controlling the motor which turns the driver in response to the reaction force attaining a predetermined magnitude. Illustratively, this control involves shutting off and reversing the connection of the motor.

The sensing means comprises a movable support for the driver which tends to move in response to the reaction force, a means to releasably restrain the support against such movement until the reaction force attains said predetermined magnitude, and a controller, such as a switch, operated by movement of the mount. Attached to the driven element are limit stops which engage this support to move the latter and thereby actuate the sensing means to control the motor upon predetermined travel of the driven element.

In the illustrative embodiment of the invention, comprising a garage door operator, the driven power transmission element comprises a flexible cable or sprocket chain which is trained about the driver, at one end of a long frame, and an idler at the other end of the frame. This driven element is connected to a carriage which is moved along the frame and carries a link for attachment to the door to be operated. A simple tension roller arrangement is provided for releasably tensioning the driven element in such a way that the tension in the element may be released readily from the outside of the garage to permit manual opening of the garage door in the event of failure of the drive mechanism.

A better understanding of the invention may be had from the following detailed description thereof taken in connection with the annexed drawings, wherein:

FIG. 1 is a section through a garage in which is installed an automatic garage door operator embodying the present drive mechanism;

FIG. 2 is a view, on a large scale, of the left-hand end of the garage door operator in FIG. 1;

FIG. 3 is a section taken along line 3—3 of FIG. 2;

FIG. 4 is a section taken along line 4—4 of FIG. 2;

FIG. 5 is a view, on a large scale, of the right-hand end of the garage door operator in FIG. 1 and showing the present drive mechanism in one position of operation;

FIG. 6 is a view similar to FIG. 5 but showing the drive mechanism in another position of operation;

FIG. 7 is a view looking in the direction of arrow 7 in FIG. 5;

FIG. 8 is a top plan view of the parts shown in FIG. 5;

FIG. 9 is a schematic diagram of an electrical circuit embodied in the garage door operator of FIG. 1;

FIG. 10 is an exploded perspective view of the present drive mechanism; and

FIG. 11 illustrates a modified form of the drive.

In FIG. 1, the operator 20 in which the present drive mechanism 22 is embodied will be seen to comprise a long, main supporting structure or frame 24. This frame comprises a hollow, rectangular channel, having a slot in its lower side, as may be observed best in FIGS. 3 and 4. The frame 24 is supported from the rafters 26 of the garage and has one end attached to a header 28 which extends across the garage door opening 30.

Closing this door opening in FIG. 1 is a garage door 32. This garage door has, along its opposite vertical side edges, projecting rollers 34 which engage in a track 36. Only one set of rollers and one track are visible in FIG. 1. Track 36 includes a lower vertical section 36a, an intermediate curved section 36b, and an upper horizontal section 36c.

The garage door structure just described is conventional and is so arranged that the door is guided, by the rollers 34 and track 36, for movement between its solid line closed position of FIG. 1 and its phantom line open position of that figure. Door 32 is moved between these positions by the operator 20, as follows.

Trained around three rotary drivers, or pulleys, 38 40 and 42, comprising the present drive mechanism 22, and a rotary idler or pulley 43a, mounted on the left-hand end of the frame 24, is a flexible, driven power transmission element 43 illustrated as comprising a cable. Attached to this cable is a carriage 44 including rollers 46 (FIGS. 2, 3 and 4) which movably support the carriage within the frame or channel 24. The lower side of this carriage projects through the previously mentioned slot 48 in the lower side of the channel 24.

As will be presently more fully described, the present drive mechanism 22 is effective to drive the cable 43 in opposite directions and thereby move the carriage 44 in opposite directions along the frame 24. Pivotally attached at one end to the carriage 44 is a link 50. In FIG. 1, the other end of this link will be seen to be attached, at 52, to the upper edge of the door 32. When the drive mechanism 22 is operated to move the carriage to the right, therefore, the door 32 is pulled to its phantom line open position. Reversal of the drive mechanism results in the return of the door to its solid line closed position.

Generally indicated at 54 in FIGS. 1 and 2 is a release mechanism which may be operated from its normal solid line position to its phantom line released position of FIG. 2 to release the door 32 for manual opening in the event of failure of the operator 20. This release mechanism comprises an arm 56 which is hinged at 58 between the side walls of the channel 24. The inner end of the arm mounts a grooved roller 60 which engages the cable 43. The arm is arranged so that when it is pivoted to its normal full line position, the roller 60 is forced against and thereby tensions cable 43. In this normal position of the arm, its roller 60 rests against the idler 43a, the arm being retained in its normal position by the tension in the cable. It will presently become clear that when the cable 43 is tensioned in this way, it is conditioned to be frictionally driven by the drive mechanism 22. When the arm 56 is rocked to its phantom line released position, tension in the cable is relieved. As will shortly become clear, this allows the cable to be pulled through the drive mechanism 22 by hand. Accordingly, with arm 56 in its released position, the door 32 may be raised manually.

Attached to the outer end of the arm 56 is a short length of rope 62. The end of this rope extends through a hole in the header 28 to the outside of the garage. This permits the means 54 to be released from the outside as well as the inside of the garage in the event of failure of the drive mechanism 22 or the power source.

Reference is now made to FIGS. 5 through 8 and FIG. 10 illustrating, in enlarged detail, the drive mechanism 22 of the invention. This drive mechanism comprises, as already mentioned, the three rotary drivers 38, 40 and 42. As may be observed best in FIG. 10, each driver consists of an integral, coaxial pinion, denoted by the number of the driver and the letter a, and a grooved pulley, denoted by the number of the driver and the letter b. The driver 38, which forms a primary driver, as will presently be seen, is fixed to a shaft or axle 62 which forms the output shaft of a reduction gear unit 64. This unit, and a motor 66 which drives the input shaft (not shown) of the unit, are attached by means 68 to a plate 70. Plate 70 is mounted on the right-hand end of the supporting structure or frame 24 by bolts 72.

Pivotally mounted on the shaft 62 is a support 74 for the drivers 40 and 42, which will be shortly seen to comprise secondary drivers. Support 74 consists of a pair of plates 76 and 78 which are joined by bolts and spacers 80. The primary driver 38 and the secondary drivers 40 and 42 are disposed between these plates, the latter drivers being rotatably mounted on the plates by means of axles or shafts 82 firmly attached to the plates.

The axes of the three drivers are located at the apices of a triangle, as shown. The gears 40a and 42a of the secondary drivers mesh with the gear 38a of the primary driver but are spaced from one another. When the primary driver 38 is rotated in either direction, therefore, the secondary drivers are both rotated in the opposite direction. It will be evident from the drawings and the description thus far that the support 74 can pivot or rock on the axis of the primary driver. During this pivoting of the support, the secondary drivers rotate about but remain in mesh with the primary driver.

The flexible power transmission element or cable 43 is trained about each of the three drivers, as shown, so that it passes first around the uppermost secondary driver 42, then between this secondary driver and the primary driver 38, around the latter driver, then between this driver and the lowermost secondary driver 40, and finally around the latter secondary driver. The cable is engaged in the grooves of the driver pulleys 38b, 40b and 42b, as shown, so that if sufficient tension exists in the cable, a frictional driving engagement is established between the cable and driver pulleys whereby the cable can be moved in one direction or the other by driving of the primary driver 38 from its motor 66. The tortuous path followed by the cable around the drivers, of course, increases the total area of contact between the cable and drivers and, therefore, the frictional driving force therebetween.

It will be evident from the preceding description and the drawings that when the primary driver 38 is rotated to move the cable 43 and the garage door 32 operatively connected therewith, the tension in one run of the cable exceeds the tension in the other run. This difference in tension creates a resultant reaction force on the secondary drivers 40 and 42 and a resultant reaction torque on the support 74 which tends to pivot the latter on the axis of the primary driver 38. The direction of this reaction torque is dependent on the direction in which the cable 43 is being moved. Thus, if the direction of operation is such that the primary driver is rotating in the clockwise direction in FIG. 6, the reaction torque acts in a direction to swing the support 74 in the clockwise direction, i.e., from the position of FIG. 6 to the position of FIG. 5. If the drive mechanism is operated in the opposite direction, the reaction torque acts in the opposite direction, i.e., in the direction to swing the support 74 from the position of FIG. 5 to the position of FIG. 6. The drive mechanism embodies means for continuously sensing this reaction torque and controlling, or stopping, the drive motor 66, in response to the reaction torque attaining a predetermined magnitude. This sensing means will now be described.

Pivotally attached at one end to the left-hand end of the support 74 and at its other end to the frame 24 is a link 84. This link is pivotally connected to the support 74 by means of a pin 86 anchored to the support and extending through a slot 88 in the link. The lost motion in this pivotal connection permits the support 74 and link 84 to rock between their positions of FIG. 5 and FIG. 6. Anchored at one end to the pivot 90 for the frame end of the link 84 and a post 92 on the support 74 is a tension spring 94. The anchor post 92 is located on a center line passing through the axis of the primary driver shaft 62 and the link connecting pin 86. It will be seen that the support 74, link 84 and spring 94 thus form, in effect, a snap-action, overcenter means or toggle joint which acts to yieldably retain the support 74 in either its limiting position of FIG. 5 or its limiting position of FIG. 6. The spring 94 resists rocking or swinging of the support from one limiting position to the other until the dead-center position is reached. When the support is pivoted just slightly past dead center, of course, the spring suddenly snaps the support to the position of FIG. 5 or 6 as the case may be.

In operation, assuming the primary driver 38 is rotating in the counterclockwise direction, in FIGS. 5 and 6, so that the door 32 is being closed, and the support 74 is in the position illustrated in FIG. 5, the resultant reaction torque previously mentioned, which is then exerted on the support, acts in a direction to swing the support in the counterclockwise direction from its position of FIG. 5 to its position of FIG. 6. This pivoting of the support, however, is resisted by the tension of the spring 94 which is set, by adjusting means 96, so that the normal reaction torque on the support during normal operating conditions is insufficient to pivot the support against the action of the spring. Assume now that the door encounters an obstruction with a resultant increase in the tension in the upper run of cable 43. This increases the reaction torque on the support 74. If the increase in the reaction torque is sufficient, it pivots the support 74, against the action of the spring 94, from its position of FIG. 5 to its position of FIG. 6. As mentioned earlier, when the support reaches a position just slightly past dead center, it suddenly snaps to its position of FIG. 6.

If the parts of the drive mechanism are assumed to be initially in the position of FIG. 6 and the primary driver 38 to be rotating in the clockwise direction, in which case the garage door 32 would be moving toward its open position, the support 74 will be retained in its position of FIG. 6 unless an obstruction is encountered to increase the now clockwise reaction torque on the support to a predetermined magnitude sufficient to cause pivoting of the support back to its position of FIG. 5.

It is evident from this discussion that the pivoted support 74, link 84 and spring 94 form, in effect, a means to continuously sense the reaction torque on the support 74. This sensing means operates to control the drive motor 66 in response to the reaction torque on the support increasing to a predetermined magnitude. This is accomplished as follows.

Mounted on the forward side of the plate 70, in FIG. 5, is a control box 98. Housed within this control box is a controller or reversing switch 100 for the drive motor 66. This switch has a pivoted actuating member 102 which extends to the outside of the control box 98 through a slot (not shown) in the left-hand wall of the latter, as the drive mechanism is viewed in FIG. 5. The outer end of this actuating member is operatively connected with the secondary driver mount 74 through a spring 104 which is attached at one end to the member and at the other end to the mount, as shown. The spring is arranged so that when the support 74 pivots to its position of FIG. 5, it pulls the actuating member 102 to its lower position of that figure. When the support 74 swings to its position of FIG. 6, the actuating member 102 is pulled upwardly to its upper position of that figure. Thus, during operation of the drive mechanism, if the reaction torque in the support 74 increases sufficiently to pivot or trip the support from one of its positions to the other, the motor control switch 100 is actuated from one of its positions to the other. As will shortly be seen, this operation of the switch 100 breaks a holding circuit for the motor and also conditions the motor for subsequent operation in the reversed direction.

As shown most clearly in FIG. 10, link 84 comprises a pair of spaced plates 106 having outwardly turned flanges 108 along their opposite edges. The cable 43 is arranged in a plane passing between these plates, the latter being generally triangularly configured so that when the link occupies its upper position of FIG. 5, it straddles the upper run of the cable 43 and when it occupies its lower position of FIG. 6, it straddles the lower run of the cable. In the upper position of the link, the upper flanges 108 on the link will be seen to be located in a plane inclined to and intersecting the upper run of the cable. Similarly, when the link is in its lower position of FIG. 6, flanges 108 along the lower edges of the link are located in a plane inclined to and intersecting the lower run of the cable.

Mounted on the cable at spaced points therealong are a pair of adjustable limit stops 110. Assuming the parts of the drive mechanism to be in the positions illustrated in FIG. 5 and the cable 43 to be moving in the direction indicated in that figure, it will be seen that the upper limit stop 110 eventually engages the upper flanges 108 on the link 84 to create a camming force on the link which tends to shift the parts of the drive mechanism to their positions of FIG. 6 in precisely the same way as the reaction force previously discussed. Similarly, if the parts of the drive mechanism are initially in the position of FIG. 6 and the cable 43 is moving in the direction indicated in that figure, the lower limit stop 110 eventually engages the flanges 108 along the lower edge of the link and creates a camming force on the link which tends to shift the parts of the drive mechanism to their positions of FIG. 5. Thus, the secondary drivers 40 and 42 and their support 74 are shifted from the position of FIG. 5 to the position of FIG. 6, or vice versa, as the case may be, in response to a reaction torque of predetermined magnitude as well as in response to predetermined travel of the driven member or cable 43. In both cases, that is, whether the support 74 is shifted in response to the reaction torque or in response to predetermined travel of the cable, the actuating member 102 for the motor control switch 100 is operated from one of its positions to the other. The manner in which this movement of the actuating member controls the motor will now be described by reference to FIG. 9.

Electrical power for operating the motor 66 is received through a pair of main power leads 112 and 114. Lead 112 connects to one blade terminal of a double-pole, double-throw switch 100. The other power lead 114 connects to one terminal of a pair of normally open contacts 116a of a relay 116. The other terminal of these contacts connects to one terminal 66a of motor 66 via a lead 118. A second terminal 66b of the motor is connected through a lead 120 which extends to one outside terminal 100b of the reversing switch 100.

The motor has a second set of terminals 66c and 66d which are connected via leads 122 and 124, respectively, to the second blade terminal 100c and a second outside terminal 100d of the reversing switch 100. The reversing switch has a second set of outside terminals 100e and 100f which are connected to the outside terminals 100b and 100d by the crossed connections 100g and 100h.

Assuming the switch 100 to be in its upper, phantom line position of FIG. 9, wherein switch terminals 100 and 100b are connected and switch terminals 100d and 100h are connected, and the relay contacts 116a to be closed, it will be seen that a circuit may be traced from the power lead 112, through switch terminals 100a, 100b, lead 120, to motor terminal 66b, and from motor terminal 66a, through lead 118, and relay contacts 116a to the other power lead 114. Motor terminals 66c and 66d are now connected through the closed switch contacts 100g and 100h. Energizing of the motor 66 in this way causes it to drive in one direction. The motor, of course, is deenergized by opening of the relay contacts 116a.

Assume now that the switch 100 is operated to its lower, solid line position wherein switch terminals 100a and 100e are connected and switch terminals 100c and 100f are connected, it will be seen that a circuit may now be traced from the power lead 112, through switch terminals 100a, 100e, lead 124 to the motor terminal 66d and from the motor terminal 66c, through lead 122, switch contacts 100c, 100f, lead 120 to the motor terminal 66b, and from the motor terminal 66a, through lead 118, and relay contacts 116a to the other power lead 114. Energization of the motor in this manner results in driving of the latter in the opposite direction. Here, again, the motor may be stopped by opening of the relay contacts 116a. Thus, operation of the switch actuating member 102 from one of its positions to the other, in response to pivoting of the support 74, results in reversing of the connections to the motor 66 and conditioning of the latter for operation in the reversed direction. This operation of the reversing switch also acts to stop the motor, as follows.

Relay 116 has a second set of normally open contacts 116b, one terminal of which is connected to one terminal of the relay coil. The other terminal of the contacts 116b connects to one terminal of a secondary of a transformer 126 via a lead 128. The other terminal of this secondary is connected to a lead 130 which extends to the other end of the relay coil. One end of the transformer primary winding is connected directly to the power lead 114 through a lead 132. The other terminal of the primary winding is connected to a lead 134 which is tied to both terminals 100b and 100e of the reversing switch 100. It will be seen, therefore, that in each position of the reversing switch, the main power lead 112 is connected to the other terminal of the transformer primary through the reversing switch and the lead 134. Relay 116 is initially energized in any suitable way, such as by a radio receiver or push button 136.

From this description, it will be seen, assuming the switch 100 is in its upper phantom line position, that the primary of the transformer 126 is energized. If the relay 116 is now energized, by operation of the receiver 136 or other suitable means, its contacts 116b close to complete a holding circuit through the secondary of the transformer and the coil of the relay 116. The relay is thus locked in energized condition.

Closure of the relay contacts 116a, in response to energizing of the relay, causes the motor 66 to drive in one direction, as previously mentioned. If the switch 100 is in its lower solid line position, of course, the motor 66 will drive in the opposite direction upon energizing of the relay 116.

During this operation of the motor, the cable 43 is moved in one direction or the other depending on the direction of operation of the motor. The drive mechanism is arranged so that when its parts are in the position of FIG. 5, the motor will drive in a direction to feed the cable in the direction indicated. Similarly, when the parts of the drive mechanism are in the position of FIG. 6, the cable will be driven in the reverse direction, as indicated. Now assume that in either case, that is, whether the cable is being moved in the direction indicated in FIG. 5 or in the direction indicated in FIG. 6, the reaction torque on the support 74 becomes sufficient to trip the latter from its current position to its opposite position in the manner already described. This results in operation of the reversing switch 100 from one of its positions to the other. During operation of the switch in this way, the energizing circuit for the primary of transformer 126 is obviously interrupted. This interruption of the primary circuit, in turn, deenergizes the holding circuit for relay 116 so that the latter returns to its normal deenergized condition wherein its contacts 116a are opened to deenergize the motor 66. Operation of the switch 100 as described above also reverses the connections to the motor so that when it is subsequently energized by energizing of the relay 116, it drives in the reverse direction.

Briefly now recounting the operation of the invention when the relay 116 is energized, motor 66 is also energized and the cable 43 is driven in one direction or the other, depending on the direction of rotation of the motor, through the drive mechanism 22. Assuming, in the illustrative embodiment of the invention, that the garage door 32 is initially closed, when the motor 66 is first energized, it will drive the cable 43 in the direction indicated in FIG. 6 and the parts of the drive mechanism 22 will occupy their positions illustrated in that figure. If the door does not encounter an obstruction while it is being opened, the then clockwise reaction torque on the support 74 will be insufficient to overcome the restraining force of the spring 94 so that the support will remain in its position of FIG. 6. Eventually, the lower limit stop 110 on the cable engages the lower flanges 108 on the link 84 to shift the parts of the drive mechanism from their position of FIG. 6 to their position of FIG. 5. During this shifting of the parts, the switch lever 102 is operated from its upper position of FIG. 6 to its lower position of FIG. 5 to deenergize the drive motor 66 and condition it for subsequent operation in the reversed direction. If the door does encounter an obstruction while it is being opened, the clockwise reaction torque on the support 74 becomes sufficient to overcome the spring 94 and pivot the support from its position of FIG. 6 to the position of FIG. 5. This results in stoppage of the motor 66 and reversal of its connections.

If the garage door 32 is initially open, energizing of the relay 116 will cause the motor 66 to drive in a direction to close the door. Here, again, if no obstruction is encountered during closure of the door, the support 74 will remain in its current position, namely, that of FIG. 5, until the upper limit stop 110 on the cable 43 engages the flanges 108 along the upper edge of the link 84 to trip the parts of the drive mechanism from their position of FIG. 5 to the position of FIG. 6. This, of course, results in stoppage of the motor and reversal of its connections. If an obstruction is met, the reaction torque on the support becomes sufficient to trip it from its position of FIG. 5 to its position of FIG. 6 and thereby stop the motor 66.

It will be apparent from the preceding description that numerous modifications in the design, arrangement of parts and instrumentalities of the invention are possible. For example, in lieu of using a cable, as in FIGS. 1–10, the flexible driven element may comprise a sprocket chain 43′ and the three rotary drivers 38′, 40′ and 42′ of the drive mechanism may embody sprockets, rather than pulleys, as illustrated at 38b′, 40b′ and 42b′ in FIG. 11. Numerous other modifications of the invention are, of course, possible within the scope of the following claims.

What is claimed is:

1. A drive comprising a supporting structure, a primary rotary driver and two secondary rotary drivers rotatably mounted on said structure for turning on spaced, parallel axes and disposed in peripheral driving engagement with the primary driver, whereby rotation of the latter drives both of said secondary drivers in rotation, a long flexible power transmission element trained about and disposed in driving engagement with each of said drivers in such a way that the drivers all tend to move the element in the same lengthwise direction during rotation of said primary driver in either direction, and means for turning said primary driver.

2. A drive mechanism comprising a frame structure, a support pivotally mounted on said structure for rocking between two limiting positions, a rotary driver rotatably mounted on said support with its rotation axis offset from the pivot axis of the support, a rotary member rotatably mounted on said structure for turning on an axis spaced from said pivot axis, a long flexible power transmission element having its ends joined to form a loop trained about said driver and member in driving engagement with said driver, whereby said element is driven in one lengthwise direction by rotation of said driver in one direction and the tension in said element while the latter is so driven exerts a torque on said support tending to rock the latter from one limiting position to the other limiting position, drive means for rotating said driver in said one direction of rotation while permitting free rocking movement of said support, means to control said drive means in response to rocking of said support from said one limiting position to said other limiting position, and snap-action means for acting between said structure and support for yieldably retaining said support in said one limiting position until the torque on the support exceeds a predetermined magnitude, whereupon said snap-action means abruptly yields to permit rocking of said support to said other limiting position.

3. A drive mechanism comprising a frame structure, a support pivotally mounted on said structure for rocking between two limiting positions, a rotary driver rotatably mounted on said support with its rotation axis offset from the pivot axis of the support, a rotary member rotatably mounted on said structure for turning on an axis spaced from said pivot axis, a long flexible power transmission element having its ends joined to form a loop trained about said driver and member in driving engagement with said driver, whereby said element is driven in one lengthwise direction by rotation of said driver in one direction and the tension in said element while the latter is so driven exerts a torque on said support tending to rock the latter from one limiting position to the other limiting position, drive means for rotating said driver in said one direction of rotation while permitting free rocking movement of said support, means to control said drive means in response to rocking of said support from said one limiting position to said other limiting position, means operatively connected between said structure and said support and forming with the latter a toggle joint which occupies one overcenter position when said support occupies said one limiting position and another overcenter position when said support occupies said other limiting position, and spring means for resiliently retaining said toggle joint in its overcenter positions.

4. A drive mechanism comprising a frame structure, a support pivotally mounted on said structure for rocking between two limiting positions, a rotary driver rotatably mounted on said support with its rotation axis offset from the pivot axis of the support, a rotary member rotatably mounted on said structure for turning on an axis spaced from said pivot axis, a long flexible power transmission element having its ends joined to form a loop trained about said driver and member in driving engagement with said driver, whereby said element is driven in one lengthwise direction by rotation of said driver in one direction and the tension in said element while the latter is so driven exerts a torque on said support tending to rock the latter from one limiting position to the other limiting position, drive means for rotating said driver in said one direction of rotation while permitting free rocking movement of said support, means to control said drive means in response to rocking of said support from said one limiting position to said other limiting position, a link pivotally connected at one end to said structure and at its other end to said support at a position offset from the pivot axis of the support, the pivotal connection at one end of said link having lost motion, whereby said link and support form a toggle joint which occupies one overcenter position when said support occupies said one limiting position and another overcenter position when said support occupies said other limiting position, and a spring connected between said link and support for resiliently retaining said toggle joint in its overcenter positions.

5. A drive mechanism comprising a frame structure, a support pivotally mounted on said structure for rocking between two limiting positions, a rotary driver rotatably mounted on said support with its rotation axis offset from the pivot axis of the support, a rotary member rotatably mounted on said structure for turning on an axis spaced from said pivot axis, a long flexible power transmission element trained about said driver and member in driving engagement with said driver, whereby said element is driven in its lengthwise direction by rotation of said driver and the tension in said element creates a torque on said support tending to rock the latter toward one limiting position while said element is being driven in one lengthwise direction and to rock said support toward the other limiting position while said element is being driven in the other lengthwise direction, drive means including a reversible motor for rotating said driver when said support occupies either limiting position and in a direction wherein the torque on said support tends to rock the latter toward the opposite limiting position, snap-action means operatively connected between said structure and support for yieldably retaining said support in said limiting positions, respectively, and means for controlling said drive means in response to rocking of said support between said limiting positions.

6. A drive mechanism comprising a frame structure, a support pivotally mounted on said structure for rocking between two limiting positions, a primary rotary driver rotatably mounted on said support for turning on the pivot axis of the support, a pair of secondary rotary drivers rotatably mounted on said support for turning on axes parallel to and spaced from said pivot axis and disposed in peripheral driving engagement with said primary driver, whereby rotation of the latter drives said secondary drivers in rotation, a long flexible power transmission element trained about and disposed in driving engagement with each of said drivers in such manner that said element is driven in its lengthwise direction by rotation of said primary driver and the tension in said element creates a torque on said support tending to rock the latter toward one limiting position while said element is being driven in one lengthwise direction and to rock said support toward the other limiting position while said element is being driven in the other lengthwise direction, drive means including a reversible motor for rotating said primary driver when said support occupies either limiting position and in a direction wherein the torque on said support tends to rock the latter toward the opposite limiting position, snap-action means operatively connected between said structure and support for yieldably retaining said support in said limiting positions, respectively, and means for controlling said drive means in response to rocking of said support between said limiting positions.

7. A drive comprising a frame structure, a support pivotally mounted on said structure for rocking between two limiting positions, a primary rotary driver rotatably mounted on said support for turning on the pivot axis of the support, two secondary rotary drivers rotatably mounted on said support for turning on axes parallel to and spaced from said pivot axis and disposed in peripheral driving engagement with said primary driver, whereby rotation of the latter drives both of said secondary drivers in rotation, a long flexible power transmission element trained about and disposed in driving engagement with each of said drivers in such a way that the drivers all tend to move the element in the same lengthwise direction during rotation of said primary driver in either direction, means for driving said primary driver in rotation, a tension in said element while the latter is being driven in either direction by said drivers creating a torque on said support tending to rock the latter toward one limiting position, snap-action means operatively connected between said structure and support and responsive to the torque on said support for releasably restraining the latter against rocking from one limiting position to the other, and means for controlling said drive means in response to rocking of said support between said limiting positions.

8. A drive comprising a frame structure, a support pivotally mounted on said structure for rocking between two limiting positions, a primary rotary driver rotatably mounted on said support for turning on the pivot axis of the support, two secondary rotary drivers rotatably mounted on said support for turning on axes parallel to and spaced from said pivot axis and disposed in peripheral driving engagement with said primary driver, whereby rotation of the latter drives both of said secondary drivers in rotation, a long flexible power transmission element trained about and disposed in driving engagement with each of said drivers in such a way that the drivers all tend to move the element in the same lengthwise direction during rotation of said primary driver in either direction, means for driving said primary driver in rotation, a tension in said element while the latter is being driven in either direction by said drivers creating a torque on said support tending to rock the latter toward one limiting position, snap-action means operatively connected between said structure and support and responsive to the torque on said support for releasably restraining the latter against rocking from one limiting position to the other, means for controlling said drive means in response to rocking of said support between said limiting positions, and a limit stop on said element operable to rock said support toward one limiting position upon predetermined travel of said element.

9. A drive mechanism comprising a movable driver having a given driving motion, a movable driven member drivably engaged with said driver so as to be driven in given motion by said driving motion of said driver, a resistance imposed on said driven member tending to restrain the latter against said given motion thereof creating a reaction force on said driver tending to bodily move the latter along a given direction line, a frame structure, a support mounting said driver on said structure for movement of the latter along said direction line, means supporting said driven member for said given motion thereof, means releasably restraining said support against movement with a given resisting force, whereby said support undergoes movement when the reaction force on said driver exceeds said given resisting force, drive means for driving said driver, control means operable in response to movement of said support for controlling said drive means, a limit stop on said driven member, and means operably connected with said support and engageable by said limit stop upon predetermined movement of said driven member for moving said support to operate said control means.

10. A drive mechanism comprising a frame structure, a support pivotally mounted on said structure, a rotary driver rotatably mounted on said support for turning on an axis spaced from the pivot axis of the support, a flexible power transmission element trained about and disposed in driving engagement with said driver, whereby rotation of the latter drives said element in its endwise direction, drive means for driving said driver in rotation while permitting free rocking of said support about said pivot axis, a tension in said element during movement of the latter in either direction by said driver creating a torque on said support tending to rock the latter in one direction on its pivot axis, means yieldably restraining said support against rocking in said one direction with a given resisting force, whereby when the torque on said support exceeds said resisting force, said support is rocked in said one direction by said torque, means for controlling said drive means in response to rocking of said support in said one direction, a limit stop fixed to said element, and means operably connected with said support and engageable by said stop upon predetermined movement of said element by said driver for rocking said support in said one direction.

11. A drive mechanism comprising a frame structure, a support pivotally mounted on said structure, a rotary driver rotatably mounted on said support for turning on an axis spaced from the pivot axis of said support, a long flexible power transmission element trained about and disposed in driving engagement with said driver, whereby rotation of the latter drives said element in its endwise direction, drive means for driving said driver in rotation while permitting free rocking of said support on its pivot axis, a tension in said element while the latter is being driven in one endwise direction by said driver creating a torque on said support tending to rock the latter in one direction on its pivot axis, a link pivotally connected at one end to said structure and at its other end to said support, the pivotal connection at one end of said link having a lost motion, whereby said link and support form a toggle joint, a spring connected between said link and said support for resiliently retaining said toggle joint in its overcenter positions, respectively, said toggle joint snapping from one overcenter position to the other overcenter position during rocking of said support in said one direction, whereby said spring and toggle joint releasably restrain said support against rocking in said one direction, a limit stop fixed to said element, said link having an edge surface inclined with respect to the path of movement of said stop with said element and engageable by said element upon predetermined movement of the latter and for causing said toggle joint to snap from said one overcenter position to said other overcenter position and said support to thereby rock in said one direction, and means for controlling said drive means in response to rocking of said support in said one direction.

12. A drive mechanism comprising a frame structure, a support pivotally mounted on said structure, a link pivotally connected at one end to said structure and at its other end to said support, the pivotal connection at one end of said link having limited lost motion, whereby said link and support form a toggle joint movable between two overcenter positions, a spring connected between said link and said support for resiliently retaining said toggle joint in said overcenter positions, respectively, a rotary driver rotatably mounted on said support for turning on an axis spaced from the pivot axis of said support, a long flexible power transmission element trained about and disposed in driving engagement with said driver, whereby rotation of the latter drives said element in its endwise direction, reversible drive means for driving said driver in either direction of rotation, tension in said element during driving of the latter in either endwise direction by said driver creating a torque on said support tending to cause said toggle joint to snap from one overcenter position to the other with resultant rocking of said support between one limiting position and another limiting position, a pair of limit stops fixed to said element at positions spaced therealong, said link having opposite side edge faces inclined to the paths of movement of said stops, respectively, with said element and engageable by said stops, respectively, to cause rocking of said support toward which the support is urged by the tension in said element, and means for controlling said drive means in response to rocking of said support between said limiting positions.

References Cited in the file of this patent

UNITED STATES PATENTS

| | | |
|---|---|---|
| 537,558 | Arthur | Apr. 16, 1895 |
| 560,229 | Perry | May 16, 1896 |
| 1,678,634 | Chandler | July 31, 1928 |
| 1,945,496 | Sloan et al. | Jan. 30, 1934 |
| 2,253,170 | Dunham | Aug. 19, 1941 |
| 2,424,385 | Cook | July 22, 1947 |
| 2,751,219 | Dodge | June 19, 1956 |
| 2,798,194 | Cantin | July 2, 1957 |

FOREIGN PATENTS

| | | |
|---|---|---|
| 601,826 | Great Britain | May 13, 1948 |